Figure 1:
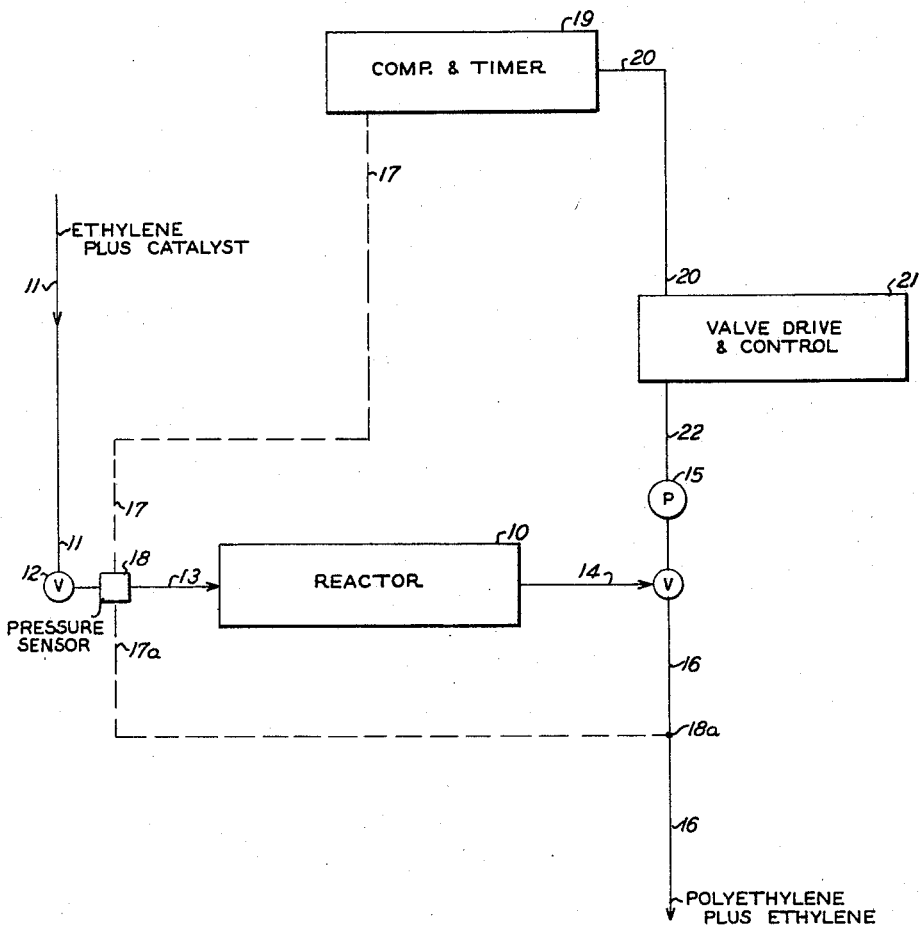
Figure 2:
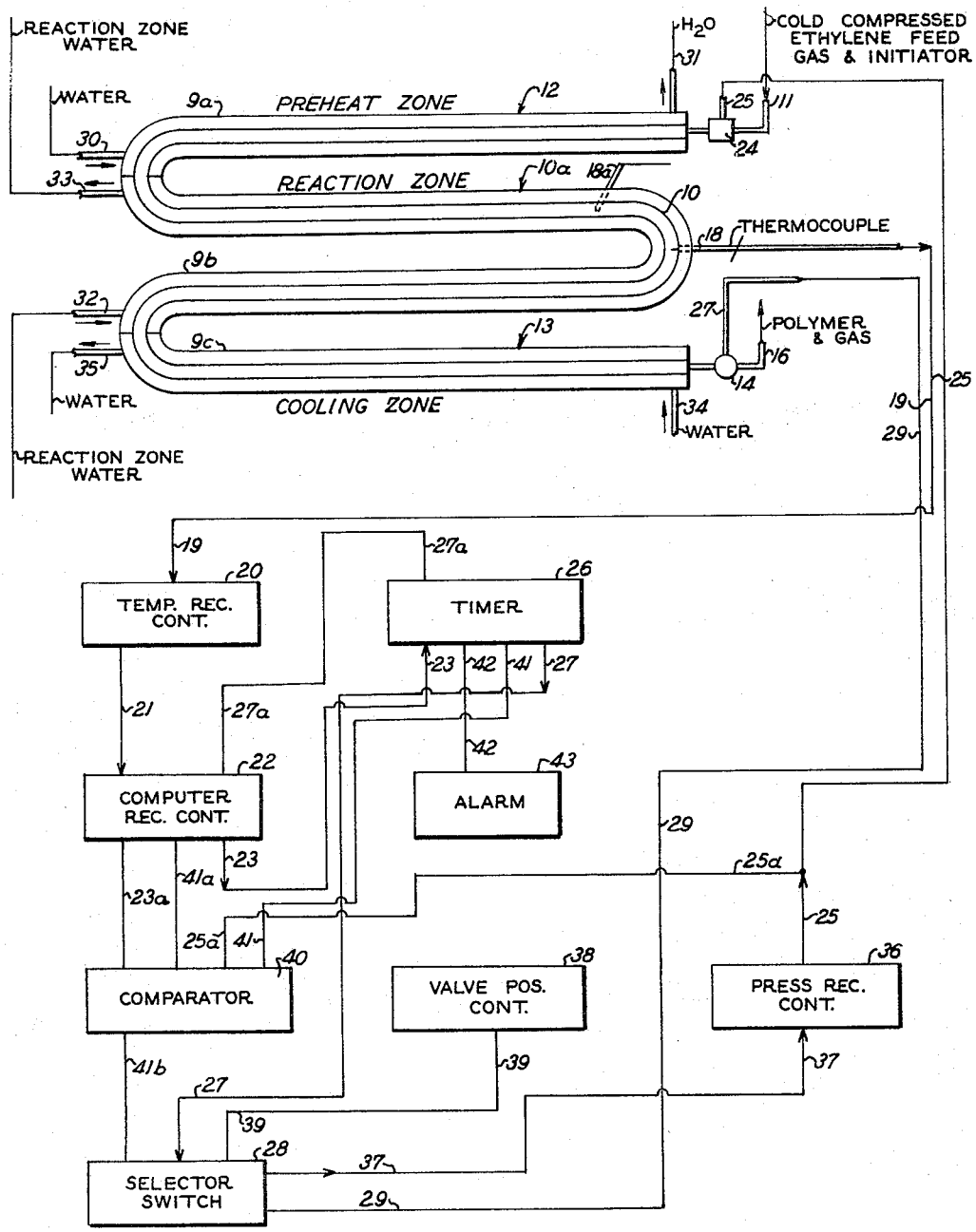

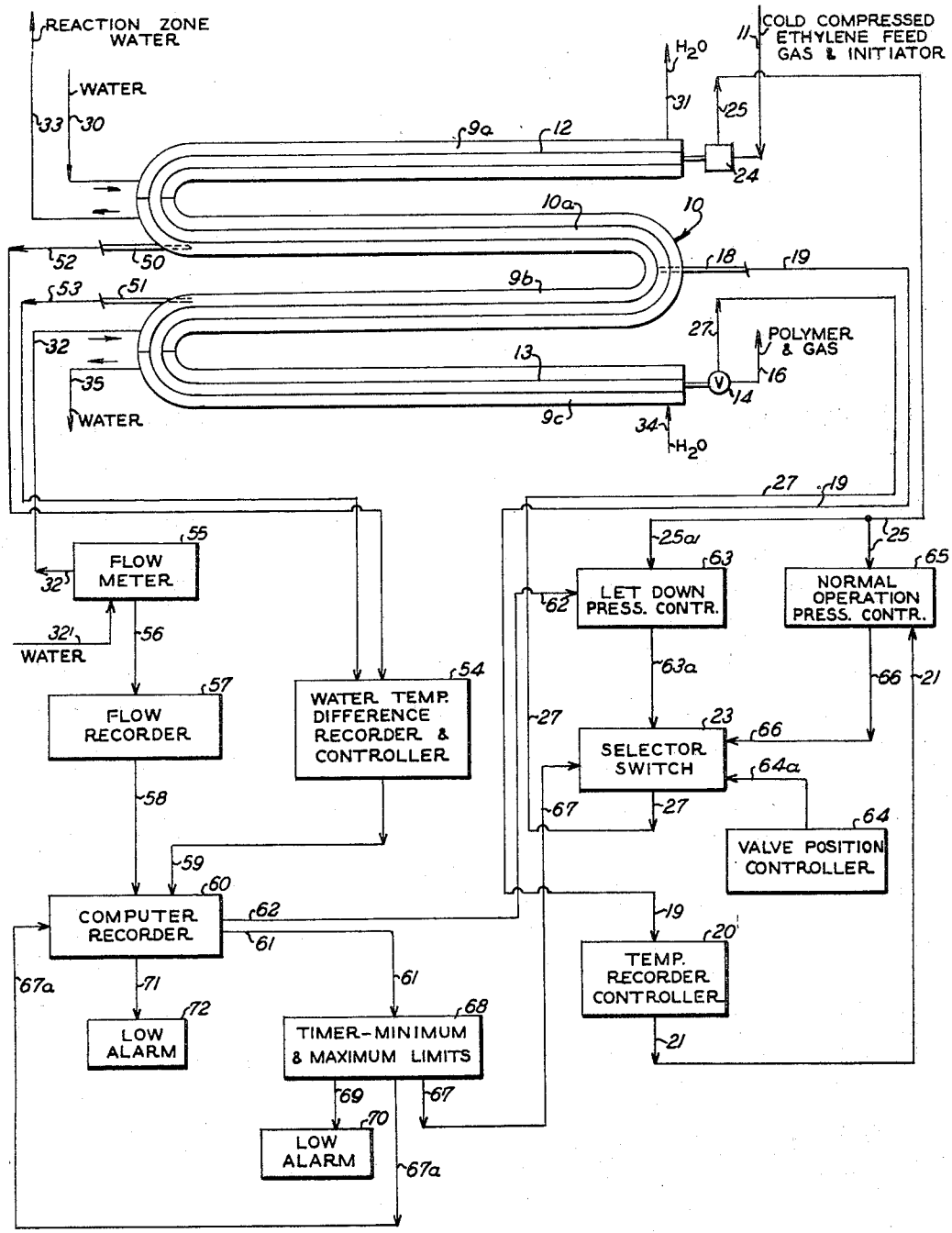

United States Patent Office 3,294,773
Patented Dec. 27, 1966

3,294,773
CONTROL SCHEME FOR POLYETHYLENE REACTOR
Manfred Gans, Leonia, N.J., Robert S. Davis, New York, N.Y., and Eugene C. Su, New Brunswick, N.J., assignors to Halcon International, Inc., a corporation of Delaware
Filed Aug. 12, 1965, Ser. No. 485,637
11 Claims. (Cl. 260—94.9)

This application is a continuation-in-part of copending applications Serial Nos. 130,811, filed August 11, 1961, 186,686, filed April 11, 1962, 194,385, filed May 14, 1962, and 210,689, filed July 18, 1962, all now abandoned.

This invention relates to processes for the high pressure polymerization of ethylene in an elongated reactor. More particularly it relates to a process wherein the reaction mixture is subjected to periodic flow pulses in order to assure prolonged continuous operation. Even more specifically it relates to a process wherein the time between flow pulses is adjusted in accordance with the degree to which the reactor was plugged at the previous flow pulse as determined by the measurement of certain process variables and wherein the time of the continuous reaction part of each cycle is adjusted according to a function of the transient part of the previous cycle. If that function of the transient part of the previous cycle is smaller than its predecessor, the time of the continuous reaction part of the present cycle is made longer, and vice versa if the function of the transient part is greater. This function is regarded as related to the degree-of-plugging of the reactor.

A problem encountered in the polymerization of ethylene under high pressure in an elongated reactor is the accumulation of polyethylene on the reactor walls which if not removed causes the performance of the reactor to deteriorate to the point where loss of control results and explosive decomposition of the reactor contents occurs, thereby forming carbon black and other undesirable products. The accumulation of polyethylene occurs in random fashion, sometimes building up rapidly and sometimes slowly. To avoid polymer accumulation and the problems caused thereby it is necessary to subject the reaction mixture to flow pulses so that for each pulse there is at least a twofold increase in linear velocity through the reactor.

It has been proposed heretofore to conduct the high pressure polymeriaztion of ethylene in an elongated reactor with intermittent pulses so as to obtain prolonged continuous operation of the process. The pulse is at fixed time intervals as disclosed in U.S. Patent 2,852,501. Such processes suffer from low reactor output and non-uniform product quality and the art is confronted by the problem of providing processes for producing polyethylene of high quality and at the same time of increasing the net output of the reactor.

It is desired to minimize the frequency of these pulses. The primary reason for minimizing the frequency of the pulses is that the production of polyethylene is increased if the period of steady state operation between successive pulses is increased. The reactor is more productive if it is operated at a higher average pressure. The secondary reason is that the pulsing operation is thermodynamically inefficient and each time the reactor is pulsed the reactor pressure must be restored to normal thus requiring an additional expenditure of energy.

The invention which has lead to the solution of the foregoing problems includes the provision of:

A process of polymerizing ethylene under high pressure in an elongated reactor wherein the reaction mixture is subjected to regular flow pulses at least once every two minutes such that for each pulse there is at least a twofold increase in linear velocity of the mixture through the reactor, including the improvement which comprises adjusting the length of time of steady state reactor operation according to the results of the previous cycle, so that if a measured function of the reactor conditions during the transient part of the previous cycle is shorter than its predecessor, the above-mentioned time of the present cycle is made longer and vice versa, this function being regarded as related to the degree-of-plugging of the reactor by polymer deposits on the walls;

A process wherein the flow pulse is obtained by opening wide the outlet end of the reactor to a low pressure, and the above-mentioned time is adjusted according to the integral of the inlet pressure versus time curve during the previous flow pulse;

A process wherein the decrease in inlet reaction pressure is 5 to 25% of the reaction pressure;

A process wherein the reaction pressure is at least 20,000 pounds per-square-inch gauge;

A process wherein the reaction temperature is in the range of 200° C. to just below the explosive decomposition temperature of the reaction mixture;

FIGURE I is a schematic illustration of a preferred embodiment of the invention.

In order to more fully describe the nature of the present invention, the following illustrative examples are set forth. Parts and percents are parts and percents by weights.

Example I

Referring to FIGURE I, a mixture of ethylene and catalysts (preheated) is passed into elongated reactor tube 10 via line 11, valve 12 and line 13. Conditions are maintained in reactor 10 so that substantial polymerization of the ethylene takes place. These conditions are well known in the art. During polymerization polymer builds up on the inner walls of tube 10 causing variation in flow rate, reactor heat transfer rate and product quality. Discharge line 14, outlet valve 15 and line 16 are provided, and the reactor effluent mixture is processed by known methods. In a preferred embodiment of the invention, pressure measuring means 18 (e.g., a strain gauge) is provided at the inlet of the reactor. It is connected via line (or lines) 17 to computer-timer 19 which is capable of substantially instantaneous response and control of outlet valve 15 so that the reactor inlet pressure may be rapidly decreased.

Computer-timer 19 is specially designed to integrate the reactor inlet pressure decrease versus time for the pressure let-down i.e., the area under the pressure versus time curve during the flow pulse; the result is an indication of the degree of plugging of the reactor tube. Depending upon the result, the computer-timer adjusts the time interval between the pressure let-down flow pulse being measured and the next pressure let-down flow pulse, that is, the period during which as relatively constant pressure is maintained, via connection 20, valve drive and control 21, and connection 22. Where the integral of the pressure decrease versus time following the opening of valve 15 is larger than that previously measured the interval to the next pressure let-down, that is, the period during which a relatively constant pressure is maintained, is shortened. The larger integral of pressure versus time during the pulse indicates a more considerable degree of polymer deposition. Where the said integral is smaller, the interval before the next pressure let-down is appropriately increased.

In accordance with the above described technique, greater process productivities are achieved as contrasted with the methods of the prior art wherein the pressure let-down is on a predesignated and fixed time cycle. Production units have operated with the method disclosed in this application and it has been possible to achieve excellent results when pulsing the reactor irregularly, in the average once every 50 seconds. Although the average interval between pulses has been 50 seconds because, of the random nature of the plugging phenomenon the interval between pulses has varied from a minimum of 39 seconds to a maximum of 55 seconds over extended periods of operation. Had the units been operated on a fixed time cycle it would have been necessary to set the timer at the minimum interval value, i.e., 39 seconds, in order to preclude any possibility of the deterioration of reactor performance due to polymer deposition. Statistical analysis of production data shows that an increase in interval from 39 seconds, which would of necessity have been the interval when using the fixed time cycle, to 50 seconds, which was the average interval for units using this scheme increases plant productivity and decreases operating cost.

In general, in carrying out the process of this invention, the polymerization conditions of temperature, pressure and the use of particular catalysts may be as described in U.S. Patent 2,852,501; however, other catalyst systems and modifiers may be added depending on the particular product desired.

In ordinary contiuous operation without flow pulsing there is low reactor output and poor quality product which is severely contaminated with carbon black. Subjecting the reaction mixture to pressure changes at fixed time intervals gives somewhat improved quality product, and output. The reaction pressure is 25,000 p.s.i., and the pulse effect is obtained by opening wide the outlet valve until the pressure drops to 15,000 p.s.i. The valve is then closed and the pressure is allowed to bulid up to the reaction pressure; the latter is maintained for a period and then the cycle is repeated by opening the outlet valve. The reaction temperature is about 240° C., the feed mixture contains about 100 p.p.m. of oxygen as catalyst, and the residence time is about 10 to 12 minutes.

By modifying the above procedure in accordance with the present invention, the length of time before a flow pulse, that is, the period during which a relatively constant pressure is maintained, is adjusted according to the integral of the inlet pressure versus time curve of the preceding pluse so that if this integral for one cycle is lower than that for the previous cycle, the time interval until the next let-down is made longer, and vice versa. The lengthening or shortening of each interval, is approximately 10% of the cycle time measured in seconds. The integral is obtained by means of the computer which is provided with a timer which controls the outlet valve. In this manner, a high quality product is obtained and the production is increased above that of previous processes. Also less shut-down time is required for clean out of the system.

In a preferred operation, the pressure is measured by a strain gauge with accompanying amplifier which provides a D.C. signal up to 10 volts representing a pressure up to 50,000 p.s.i.g. The difference between the strain gauge pressure signal and the pressure set point (e.g., as set on a potentiometer) is added algebraically in an amplifier and the resulting signal is applied to a series of amplifiers which controls the outlet valve to maintain the desired pressure. A typical three-mode cascade controller may be used for controlling the reaction pressure during the continuous part of the cycle.

During the let-down part of the cycle, the pressure signal from the strain gauge is applied to an integrator which integrates the pressure during this period. In this part of the cycle, the pressure is let down a previously determined amount, e.g., 5 to 25% of the reaction pressure.

The desired time for the continuous part of the operation is determined by the voltage output of another integrator, based on a fixed potential signal fed thereinto. At the start of this part of the operation, another integrator measures the actual elapsed time thereof, based on a fixed potential fed thereinto. When the elapsed time voltage signal is equal to the desired time voltage signal, as measured in a comparator, the transient let-down pulse is started by closing appropriate relay circuits. When the let-down operation starts, the control valve setting is changed to the desired percentage opening as set in a potentiometer assembly. Also, when the let-down operation starts, another integrator integrates the pressure signal for the elapsed time of the let-down. If the integral signal of this let-down pulse is greater than that of a previously set value, a circuit is activated which imposes upon a condenser a previously set charge, and when the next cycle is started, this charge is added algebraically to the desired continuous time cycle, thereby shortening it; and if the relative signal value is smaller, then the next cycle is lengthened in an analogous manner. The percentage increase or decrease per cycle may be adjusted by means of an appropriate potentiometer assembly, in a range up to 20% of the continuous operation time, but desirably less than 10%.

At the start of each cycle, each of the various measuring devices is brought back to zero, so as to start anew. At the start of the next continuous operation, the outlet valve is reset to give the operating pressure. Provision is made for maximum cycle time as well as for maximum pressures. The operation may be combined with other control means, including temperature regulating means. The start-up and shut-down operations may be controlled manually or by means of an appropriate computer modification, if desired.

Example II

The above procedure is followed, except, instead of using pressure versus time as the process variable or function for controlling the cycle time, equivalent results are obtained by using transient reactor pressure drop as the controlling variable. It is measured directly with an appropriate strain gauge connected to the inlet end of the reactor and also directly upstream of the let-down valve via connection 18a and pressure line 17a.

These variables or functions are regarded as related to the degree-of-plugging of the reactor, and for convenience may be termed degree-of-plugging factors. Several other variables also related to the degree-of-plugging of the reactor may be measured and equivalent corrective action taken.

For example the time between flow pulses can be adjusted in accordance with the degree to which the flow of reaction mixture and the removal of heat of reaction through the reactor walls have been impeded since the previous flow pulse as determined by the measurement of certain process variables. The steady state reaction period of each cycle, that is, the period during which a relatively constant pressure is maintained, is adjusted according to a temperature function of the previous cycle so that if this function of the previous cycle is smaller than its immediate predecessor, the time of the steady state reaction period of the present cycle is made shorter, and vice versa. This temperature function is regarded as related to the degree-of-fouling of the reactor.

The following process has been invented:

A process of polymerizing ethylene under high pressure in an elongated reactor wherein the reaction mixture is subjected to regular flow pulses at least once every two minutes such that for each pulse there is an at least two-fold increase in linear velocity of the mixture through the reactor, including the improvement which comprises adjusting the length of time of steady state reactor operation according to the degree-of-fouling factor since the previous pulse, so that if said factor for the previous pulse is smaller than its immediate predecessor the time before the next pulse is made shorter, and vice versa, said factor being the integral as defined by the equation:

$$I = A \int_{\theta_1}^{\theta_2} (T_{ss} - T)^b d\theta$$

where
- $I$ = the integral
- $A$ = a constant
- $T_{ss}$ = reactor temperature during steady state operation in °F.
- $T$ = temp. in °F. in the reactor
- $b$ = a constant
- $\theta$ = time in seconds
- $\theta_1$ = time at beginning of pulse
- $\theta_2$ = time at end of pulse a process of polymerizing ethylene under high pressure in an elongated reactor wherein the reaction mixture is subjected to regular flow pulses at least once every two minutes such that for each pulse there is an at least two-fold increase in linear velocity of the mixture through the reactor including the improvement which comprises adjusting the increase in linear velocity according to the degree-of-fouling factor since the previous pulse, so that if said factor for the previous pulse is smaller than its immediate predecessor, the said velocity increase is made greater, and vice versa, said factor being the integral as defined by the above mentioned equation;

FIGURE II is a schematic illustration of a preferred embodiment of the invention.

Example III

Referring to FIGURE II, a mixture of ethylene and initiator is passed via line 11 into the preheating zone 12 and the reaction zone 10a of the elongated tube reactor 10. Conditions are maintained in the reaction zone 10a so that substantial polymerization of the ethylene takes place. The polymer formed and unreacted ethylene are further cooled if desired, in cooling zone 12, and then discharged into line 16 through pressure control valve 14. The discharged reaction mixture from line 16 is further processed by known methods.

A strain gauge 24 is provided at the reactor inlet to measure reactor pressure. The pressure signal from the strain gauge is transmitted via line 25 to pressure recorder controller 36 which acts accordingly on the reactor pressure control valve 14. The reactor tube 10 is provided with pressurized water jackets 9a, 9b, 9c, around the preheating, reaction, and cooling zones, respectively, and pressurized water at different temperatures passes through the jackets to accomplish the desired heating or cooling via lines 30, 31, 32, 33, 34 and 35.

While the polymerization is taking place in the reactor tube 10, polymer builds up on the inner wall of the reactor and causes variation in flow rate, reactor heat transfer rate and product quality.

In a preferred embodiment of the present invention for controlling this polymer build-up, temperature measuring means 18, e.g. a high speed thermocouple, is provided in the critical section of the reactor where the reactor temperature is higher than 400° F., and is connected via line or lines 19 to temperature controller 20, and to computer 22 via line 21. The computer 22 is connected to timer 26 via line 23. The timer in turn is connected via line 27 to, and acts on, selector switch 28 which determines whether the valve 14 at the reactor outlet is to be controlled by either pressure controller 36 or valve position controller 38. Additional measuring means 18a may also be provided with analogous connections and controllers.

Computer 22 is designed to compute the time integral of reactor temperatures for the elapsed time during the pressure let-down as defined by the equation set forth above; the result is an indication of the degree of fouling of the reactor tube. As the pressure in the reactor is reduced the temperature is likewise reduced. The temperature $T_{ss}$ corresponds to the reactor temperature during normal operation, that is, when the pressure is maintained constant. The temperature T is the instantaneous temperature in the reactor during the period of pressure let-down, that is, the period during which the integral is being evaluated. When the reactor is fouled with polymer some of that polymer will accumulate on the temperature sensing element thereby decreasing its sensitivity to any temperature change in the reactor. In the extreme case, during a pressure let down, when there is a temperature decrease in the reactor, the temperature sensing element will record no temperature decrease. By evaluating the integral, I, the degree of fouling factor, and comparing it to its immediate predecessor, it is thereby possible to gain an important and critical insight into the degree of fouling of the reactor and to take appropriate corrective action.

Depending upon the result, the computer and the timer adjust the time interval between the pressure let-down flow pulse being measured and the next pressure let-down flow pulse, via connection 23. Where the computed integral of the temperature is greater than that previously measured, the interval to the next pressure let-down is appropriately decreased. A smaller integral of temperature versus time during the pulse indicates a more considerable degree of reactor deposition, and vice versa.

In a preferred operation, the pressure is measured by a strain gauge 24 with accompanying amplifier which provides a D.C. signal up to 10 volts representing a pressure up to 50,000 p.s.i.g. The difference between the strain gauge pressure signal and the pressure set point as set on a potentiometer is added algebraically in an amplifier and the resulting error signal is applied via line 29 to a series of amplifiers which controls the outlet valve 14 to maintain the desired pressure. A typical three-mode cascade controller may be used for controlling the reaction pressure during the continuous part of the cycle. Both the amplifiers and the three mode controller are contained in pressure controller 36.

During the let-down part of the cycle, the temperature signal from one or more thermocouples (18, 18a, etc.) located in the reaction zone where the temperature is at least 400° F. is applied respectively to one or more integrators, each of which computes the time integral of the reaction temperature during this period according to the equation mentioned above and all of which are contained in computer 22. The output of each integrator is transmitted to timer 26 for the automatic adjustment of the time interval before the next pressure let-down pulse. During this part of the cycle, the pressure is let-down a previously determined amount, e.g., 15% of the reaction pressure, and there is an attendant temperature decrease. This pressure reduction is obtained through the control of valve 14 by the valve position controller 38.

The desired time interval for the continuous part of the operation, that is, the period during which a relatively constant pressure is maintained, for the following cycle is determined by the voltage output of another integrator contained in timer 26, according to the signal received from the computer 22 via line 23. At the start of this part of the operation, another integrator which is also contained in timer 26, measures the actual elapsed time thereof. When the elapsed time voltage signal is equal to the desired time voltage, as measured by a comparator which is contained in timer 26, a transient let-down pulse is transmitted to the selector switch 28, via line 27.

The transient pulse actuates selector switch 28 to close appropriate relay circuits. As a result, valve 14 becomes controlled by valve position controller 38. Similarly a signal is sent to computer 22 via line 27a and as a result each integrator in computer 22 starts computing the time integral of reactor temperature according to the equation mentioned above until the reactor pressure is reduced to a predetermined value. If the integral signal during this period is smaller than that of the value obtained in a like manner in the previous cycle, a signal is transmitted to timer 26 via line 23 to the effect that the desired time interval for steady state continuous operation of the following cycle is decreased; and if the said integral signal is greater, then the next cycle time interval is lengthened in an analogous manner. The percentage increase or decrease in cycle time may be adjusted by means of appropriate potentiometers in a range up to 20% of the previous steady state or continuous operation time, desirably less than 10%. Provision is made for confining the operable cycle time within predetermined maximum and minimum limits.

When the reactor pressure is lowered by a predetermined amount e.g. 5 to 15% of the steady state operation pressure, comparator 40 sends a signal to selector switch 28 via line 41b, and another signal to computer 22 via line 41a. Upon receiving the signal from the comparator, the selector switch opens appropriate switch circuits so that valve 14 becomes controlled by pressure controller 36 and so that each of the various measuring devices is brought back to the predetermined initial values for the start of another steady state or continuous operation. Similarly, at the signal from the comparator via line 41a each integrator in the computer stops computing, so that it will be reset for computing the time integral of reactor temperature during the following let-down period. The integral signal is stored in an appropriate memory device in the integrator; this stored signal will be compared with the integral signal computed for the following cycle of operation.

Example IV

Ethylene feed gas (approximately 12,000 lbs./hr., at approximately 22,000 p.s.i.g. pressure and 80° F.) containing 20 p.p.m. of $O_2$ is fed into the preheating zone where its temperature is raised to 350° F.

The setting of the instruments is as follows:

(1) The timer 26 is set for a 55 second cycle time, and at the moment of this observation its elapsed time is 10 seconds. The timer 26 acts on the selector switch 28 via line 27 in such a way that the pressure controller 36 is connected via line 29 to the motor in the valve unit for setting valve 14. At this moment, the valve 14 is under the control of the pressure controller 36 which adjusts the position of the valve in such a way that the pressure at the strain gauge 24 is maintained at 22,000 p.s.i.g.

(2) Computer recorder controller 22 has registered a value of 58,000 during the previous pressure let-down.

(3) Temperature recorder controller 20 shows a temperature of 540° F.

(4) Valve position controller 38 is set for 70% open and it is not in the circuit at this moment since the timer holds the selector switch in the open position.

(5) Comparator 40 is set for 19,000 p.s.i.g. and it is not in the circuit at this moment. Its function is to compare the actual reactor pressure as transmitted from gauge 24 via line 25 and line 25a with its set pressure. When the comparator is activated and these two pressures are equal, an electric signal is sent to the computer controller 22 via line 41a.

When the timer reaches the elapsed time of 55 seconds, the following events happen:

(a) Timer 26 advances the selector switch 28 so that valve position controller 38 is connected via line 29 to the motor of valve 14. The valve will now go into the 70% open position. Simultaneously timer 26 resets itself to zero. At the same time, the timer 26 starts the computer 22.

(b) Comparator 40 compares the actual reactor pressure transmitted to it from the strain gauge 24 with its pressure set point (19,000 p.s.i.g.). When these two values (both are transmitted as electrical voltages which are suitably amplified) are equal, the comparator advances the selector switch 28 via line 41b so that the motor for valve 14 is again controlled by 36 and at the same time the comparator stops the calculation of the computer controller 22 via line 41a.

(c) The three mode pressure controller 36 now takes over again, building up the reactor pressure to its set pressure (22,000 p.s.i.g.). At the same time, computer controller 22 completes the calculation and compares the result with the control point (the stored time-temperature integral for the previous cycle). If the computed integral is smaller than the control point set on the computer 22 the computer resets the time in 26 so that the next cycle will be shortened by a percentage of the previous cycle set on the timer 26 and/or the computer will reset the pressure set point on 40 via line 23a so that the control pressure of 40 is decreased. If the computed integral is larger than the control point the computer resets the timer 26 to lengthen the next cycle. If the corrective action of the computer is unsuccessful, the succeeding cycle lengths may become too short for efficient operation. At this point alarm 43 is triggered via a signal from line 42; this warns the operator to shut down the plant and clean the reactor, e.g., with a solvent such as xylene.

Example V

It is preferable that more than one computer controller of the type designated computer controller 22 be provided. Each of these has its own unit 20 and its own thermal element (18a, etc.) in different positions in the reactor. While the reactor is known to be clean, different appropriate values are set as the control values for each computer controller, but each computer does its own computation during pressure let-down.

Each computer is designed so that the computed value generates a high voltage signal if the time cycle of 26 is to be decreased, and a low voltage signal if the time cycle of 26 is to be increased. The output voltage of each computer is then fed to a high signal selector. Swartouts Underide and Overide Adaptors Type A5A are suitable for this application. This high signal selector will not pass a low voltage signal from any of the computers as long as there is a high voltage signal from any of the other computers so that a time cycle shortening signal gets preferential treatment. The signal which finally is passed through the high signal selector takes the corrective action on the timer 26 and/or the set point for comparator 40, as illustrated in Example IV.

A variation in the foregoing scheme which achieves excellent results includes the provision of:

A process of polymerizing ethylene under high pressure in an elongated reactor wherein the reaction mixture is subjected to regular flow pulses at least once every two minutes such that or each pulse there is an at least twofold increase in linear velocity of the mixture through the reactor, including the improvement which comprises adjusting the length of time of steady state reactor operation according to the degree-of-fouling factor since the previous pulse so that if said factor for the previous pulse is smaller than a predecessor thereof using a clean reactor the time before the next pulse is made shorter, and vice versa, said factor being the integral as defined above.

A process of polymerizing ethylene under high pressure in an elongated reactor wherein the reaction mixture is subjected to regular flow pulses at least once every two minutes such that for each pulse there is an at least twofold increase in linear velocity of the mixture through the reactor including the improvement which comprises adjusting the increase in linear velocity according to the degree-of-fouling factor since the previous pulse, so that if said factor for the previous pulse is smaller than a predecessor thereof using a clean reactor the said velocity increase is made greater, and vice versa, said factor being the integral as defined by the above mentioned equation.

The apparatus required is substantially similar to that disclosed in Example III above. The integral signal is compared however, with a predecessor value, stored in the memory unit, which was obtained when the reactor was in a clean condition.

Another variable or function which is related to the degree-of-plugging of the reactor is the product of the rate of flow of cooling water in the reaction zone jacket times the temperature increase of this water in flowing through the jacket. When the reactor walls become plugged this product decreases and vice versa.

The following process has been invented:

A process of polymerizing ethylene under high pressure in an elongated reactor wherein the reaction mixture is subjected to regular flow pulses at least once every twofold increase in linear velocity of the mixture through the reactor including the improvement of adjusting the length of time of steady state reactor operation according to the degree-of-fouling factor of the previous pulse, so that if this factor for the previous pulse is smaller than a predecessor thereof using a clean reactor the time before the next pulse is made shorter, and vice versa, this factor being the time average of the product of rate of flow of cooling water in the reaction zone jacket times the temperature increase of this water in flowing through this jacket.

FIGURE III is a schematic illustration of a preferred embodiment of the invention.

*Example VI*

Referring to FIGURE III, a mixture of ethylene and catalysts is passed into elongated reactor tube 10 by means of line 11 and preheat zone 12. Conditions are maintained in the reaction zone 10a of reactor 10 so that substantial polymerization of the ethylene takes place. During the polymerization polymer builds up on the inner walls of the reactor tube 10 and causes variation in flow rate, reactor heat transfer rate and product quality. Outlet or let-down valve 14 and discharge line 16 are provided and the mixture discharged therethrough is further processed by known techniques. In a preferred embodiment of the invention, temperature measuring means 18, a high speed thermocouple, is provided in a section of the reactor where the reactor temperature is higher than 400° F., and connected via line 19 to recorder controller 20. The temperature controller 20 ocntrols the reaction temperature by sending an appropriate signal via line 21 to pressure controller 65.

A strain gauge 24 at the reactor inlet is provided to measure reactor pressure and the impulse from the gauge is transmitted via line 25 to pressure controller 65 which in turn acts on valve 14 via line 27.

A heat exchange fluid jacket is provided for the preheating zone 12. Water is a preferred heat exchange fluid. The water enters via inlet 30 and leaves via outlet 31. It may be at any desired temperature to achieve the desired pre-heating. Heat exchange fluid is also passed through the jacket in cooling zone 13. This fluid enters via inlet 34 and leaves via outlet 35. The main part of the reactor or reaction zone 10a is provided with a heat exchange jacket through which water or other fluid is passed via inlet 32 and outlet 33. This jacket is provided with one or more thermocouples 51 near the water inlet, and one or more thermocouples near or somewhsat spaced about the water outlet. These thermocouples are connected via lines 53 and 52 to the recorder controller 54, and the temperature difference impulse is passed therefrom via line 59 to computer recorder 60.

The reaction zone jacket cooling water inlet 32 is provided with a flow meter 55, and the impulse corresponding to the reading thereof is passed via line 56 to flow recorder 57, and also therefrom via line 58 to computer recorder 60. In the latter there is a computation of the time average of the product of the flow rate multiplied by the rise in water temperature, and an impulse corresponding to the magnitude thereof is passed via line 61 to timer 68. Also, such an impulse is passed via line 62 to let-down pressure controller 63.

Computer recorder 60 is connected via line 71 to a low temperature alarm 72, which is set to sound an alarm when the signal from the computer recorder is below a previously set value.

The timer 68 is set for the minimum and maximum steady state operation times. An impulse therefrom is passed via line 69 to a low alarm 70 which is set to sound an alarm if the impulse is below a previously set value. Also, an impulse is passed from timer 68 via line 67 to selector switch 23 which determines the opening of the reactor valve 14 via an impulse passed from the switch via line 27 to the valve motor which controls the valve setting.

Computer recorder 60 is so designed as to integrate the product of the cooling water temperature increase and its flow rate. The integration is carried out for the period between the time when the reactor pressure has reached its set point after the transient flow pulse and the time for the next flow pulse, that is, the period during which a relatively constant pressure is maintained. The resultant signal is further divided by the elapsed time since the integration has begun, thus yielding the desired time average for the product of the cooling water temperature increase and its flow rate. This average value provides a measure of the amount of heat energy transferred from the reaction mixture to the cooling water. Since the reaction temperature is under control by 20, the amount of heat transferred to the cooling water is closely related to the degree of fouling at the reactor tube walls. Thus, depending on the time average value for the product of the cooling water temperature rise and its flow rate, the computer 60 adjusts the time interval between the pressure let-down flow pulse being measured and the next pressure let-down flow pulse, via connection 61. Where this computed product is smaller than that previously measured, the interval to the next pressure let-down is shortened; where the said integral is larger, the interval before the next pressure let-down is appropriately increased.

In a preferred operation, the pressure is measured by a strain gauge 24 with an accompanying amplifier which provides a D.C. signal up to 10 volts representing a pressure up to 50,000 p.s.i.g. The difference between the strain gauge pressure signal and the pressure set point, as set on a potentiometer, is added algebraically in an amplifier contained in 65 and the resulting signal is applied to a series of amplifiers which controls the outlet valve 14 to maintain the desired pressure. A typical three-mode cascade controller may be used for controlling the reaction pressure during the continuous part of the cycle.

During the let-down part of the cycle, the pressure is let-down a previously determined amount e.g., 5 to 15% of the reaction pressure, as controlled by controllers 63 and 64, via line 63a and 64a, switch 23 and line 27 acting on the motor of let-down valve 14.

The desired time for the continuous part of the operation is determined by the voltage output of another integrator contained in 68 according to the signal from 60 via 61 based on a fixed potential signal fed thereinto. At the start of this part of the operation, another integrator which is also contained in 68 measures the actual elapsed time thereof, based on a fixed potential fed thereinto. When the elapsed time voltage signal is equal to the desired time voltage signal the transient let-down pulse is started by closing appropriate relay circuits. When the let-down operation starts, the control valve 14 setting is changed to the desired percentage opening by a potentiometer assembly contained in 64. If the computed signal (from 60) is smaller than that of a previously set value obtained in like manner with the reactor in clean condition, a circuit is activated which imposes upon a condenser contained in 68 a previously set charge, and when the next cycle is started, this charge is added algebraically to the steady state or continuous time cycle, thereby shortening it; and if the relative signal valve is larger, then the next cycle is lengthened in an analogous manner. The percentage increase or decrease per cycle may be adjusted by means of an appropriate potentiometer assembly contained in 68 in a range of 20% of the steady state or continuous operation time but desirably less than 10%.

At the start of each cycle, each of the various measuring devices is brought back to zero, so as to start anew. At the start of the next continuous operation, the outlet valve is reset to give the operation pressure. Provision is made for maximum and minimum cycle times as well as for maximum pressures. The operation may be combined with other control means, e.g. the start-up and shut-down operations may be controlled manually or by means of an appropriate computer modification if desired.

*Example VII*

Ethylene feed gas approximately 12,000 lbs./hr. at approximately 22,000 p.s.i.g. pressure and 80° F. containing 20 p.p.m. of $O_2$ is fed into the preheating zone where its temperature is raised to 350° F.

The position of the instruments is a follows:

(1) The timer 68 is set for a 55 second cycle time, and at the moment observation is started its elapsed time is 10 seconds. The timer 68 acts on the selector switch 23 via line 67 in such a way that the pressure controller 65 is connected to the motor for setting valve 14 via line 66 and 27. At this moment the valve 14 is under the control of the pressure controller 65 which adjusts the position of the valve in such a way that the pressure at the strain gauge 24 is maintained at 22,000 p.s.i.g.

(2) Temperature recorder controller 20 shows a temperature of 540° F.

(3) Valve position controller 64 is set for 70% open and it is not in circuit at this moment since the timer holds the selector switch in the 65 position.

(4) Let-down pressure controller 63 is set for 19,000 p.s.i.g. and it is also not in the circuit at this moment.

When the timer 68 reaches the elapsed time of 55 seconds, the following events happen.

(a) Time 68 advances the selector switch 23 so that valve position controller 64 is connected via lines 64a and 27 to the motor of valve 14. The valve will now go into the 70% open position. Simultaneously timer 68 and computer 60 will reset themselves to zero;

(b) The let-down pressure controller 63 now compares the actual reactor pressure transmitted to it from the strain gauge 24 with the set-point (19,000 p.s.i.g.). When these two values are equal, the following actions take place;

(c) The controller 63 sends a signal to the selector switch with the result that now the valve 14 is again controlled by 65. After the three mode pressure controller 65 takes over it then builds up the reactor pressure to its set point (22,000 p.s.i.g.) until the next pressure let-down pulse;

(d) Simultaneously, timer 68 starts timing a new cycle and computer 60 begins its computation of the above-mentioned reactor-fouling factor for the new cycle. Prior to its being reset to zero, the computer 60 compares the computed signal with the control point previously determined from operation with a clean reactor. If the computed signal is smaller than the control point the computer resets the desired cycle time in 68 so that the new cycle will be shortened by a percentage of the previous cycle time and/or the computer will reset the let-down pressure controller 63 so that the let-down pressure set-point is decreased to less than 19,000 p.s.i.g. If the computed signal is larger than the control point the computer will reset the timer to lengthen the new cycle and/or the computer will reset the let-down pressure controller 63 to increase the let-down pressure, to greater than 19,000 p.s.i.g. If the corrective action of the computer is unsuccessful the succeeding cycle lengths may become too short for efficient operation. At this point the operator will be alarmed to shut down the plant and clean the reactor with a solvent such as xylene.

In view of the foregoing disclosures, variations, and modifications thereof will be apparent to one skilled in the art, and it is intended to include within the invention all such variations and modifications except as do not come within the scope of the appended claims.

What is claimed is:

1. In a cyclic process for the polymerization of ethylene under high pressure in an elongated reactor, wherein the reaction mixture is maintained at a relatively constant pressure for a period of time and in addition, subjected to regular flow pulses at least once every two minutes, such that for each pulse there is at least a twofold increase in linear velocity of the mixture through the reactor, the improvement which comprises: adjusting the period during which a relatively constant pressure is maintained according to the degree-of-plugging factor of the previous pulse, so that if said factor for the previous pulse is smaller than its predecessor, the said period is made longer and vice versa.

2. In a cyclic process for the polymerization of ethylene under high pressure in an elongated reactor, wherein the reaction mixture is maintained at a relatively constant pressure for a period of time and in addition, subjected to regular flow pulses at least once every two minutes, such that for each pulse there is at least a twofold increase in linear velocity of the mixture through the reactor, the improvement which comprises: adjusting the period during which a relatively constant pressure is maintained according to the integral of the reactor inlet pressure versus time curve of the previous pulse, so that if said integral is smaller that its immediate predecessor the said period is made longer, and vice versa.

3. A process of claim 2 wherein the flow pulse is obtained by opening wide the outlet end of the reactor to a low pressure.

4. A process of claim 3 wherein the decrease in inlet pressure is 5 to 25% of the reaction pressure.

5. A process of claim 4 wherein the reaction pressure is at least 20,000 pounds-per-square-inch gauge.

6. A process of claim 5 wherein the reaction temperature is in the range of 200° C. to just below the explosive decomposition temperature of the reaction mixture.

7. In a cyclic process for the polymerization of ethylene under high pressure in an elongated reactor, wherein the reaction mixture is maintained at a relatively constant pressure for a period of time and in addition, subjected to regular flow pulses at least once every two minutes, such that for each pulse there is at least a twofold increase in linear velocity of the mixture through the reactor, the improvement which comprises: adjusting the period during which a relatively constant pressure is maintained according to the integral as defined by the equation:

$$I = A \int_{\theta_1}^{\theta_2} (T_{ss} - T)^b d\theta$$

where $I$ = the integral
$A$ = a constant
$T_{ss}$ = reactor temperature at steady state operation in ° F.
$T$ = temperature in ° F. in the reactor
$b$ = a constant
$\theta$ = time in seconds
$\theta_1$ = time at beginning of pulse
$\theta_2$ = time at end of pulse so that if said integral for the previous pulse is smaller than its immediate predecessor the period during which the reactor pressure is maintained relatively constant is decreased and vice versa.

8. In a cyclic process for the polymerization of ethylene under high pressure in an elongated reactor, wherein the reaction mixture is maintained at a relatively constant pressure for a period of time and in addition, subjected to regular flow pulses at least once every two minutes, such that for each pulse there is at least a twofold increase in linear velocity of the mixture through the reactor, the improvement which comprises: adjusting the period during which a relatively constant pressure is maintained according to the integral as defined by the equation:

$$I = A\int_{\theta_1}^{\theta_2}(T_{ss}-T)^b d\theta$$

where $I$ = the integral
$A$ = a constant
$\theta$ = time in seconds
$T_{ss}$ = reactor temperature at steady state operation in °F.
$T$ = temperature in °F. in the reactor
$b$ = a constant
$\theta_1$ = time at beginning of pulse
$\theta_2$ = time at end of pulse so that if said integral is smaller than a predecessor thereof where the reactor is clean the period during which the reactor pressure is maintained relatively constant is made shorter and vice versa.

9. In a cyclic process for the polymerization of ethylene under high pressure in an elongated reactor, wherein the reaction mixture is maintained at a relatively constant pressure for a period of time and in addition, subjected to regular flow pulses at least once very two minutes, such that for each pulse there is at least a twofold increase in linear velocity of the mixture through the reactor, the improvement which comprises: adjusting the increase in linear velocity of the mixture through the reactor according to the degree-of-fouling factor so that if said factor for the precious pulse is smaller than its immediate predecessor the velocity increase is made greater than vice versa said factor being the integral of the equation:

$$I = A\int_{\theta_1}^{\theta_2}(T_{ss}-T)^b d\theta$$

where $I$ = the integral
$A$ = a constant
$T_{ss}$ = reactor temperature at steady state operation in °F.
$T$ = temperature in °F. in the reactor
$b$ = a constant
$\theta$ = time in seconds
$\theta_1$ = time at beginning of pulse
$\theta_2$ = time at end of pulse 10. In a cyclic process for the polymerization of ethylene under high pressure in an elongated reactor, wherein the reaction mixture is maintained at a relatively constant pressure for a period of time and in addition, subjected to regular flow pulses at least once every two minutes, such that for each pulse there is at least a twofold increase in linear velocity of the mixture through the reactor, the improvement which comprises: adjusting the increase in linear velocity of the reaction mixture according to the degree-of-fouling factor of the previous pulse, so that if said factor for the previous pulse is smaller than a predecessor thereof where the reactor was clean the said velocity increase is made greater and vice versa said factor being the integral:

$$I = A\int_{\theta_1}^{\theta_2}(T_{ss}-T)^b d\theta$$

where $I$ = the integral
$A$ = a constant
$\theta$ = time in seconds
$T_{ss}$ = reactor temperature at steady state operation in °F.
$T$ = temperature in °F. in the reactor
$b$ = a constant
$\theta_1$ = time at beginning of pulse
$\theta_2$ = time at end of pulse 11. In a cyclic process for the polymerization of ethylene under high pressure in an elongated reactor, wherein the reaction mixture is maintained at a relatively constant pressure for a period of time and in addition, subjected to regular flow pulses at least once every two minutes, such that for each pulse there is at least a twofold increase in linear velocity of the mixture through the reactor, the improvement which comprises: adjusting the period during which a relatively constant pressure is maintained according to the degree-of-fouling factor of the previous pulse, so that if said factor for the previous pulse is smaller than a predecessor thereof when the reactor is clean the said period is shortened, and vice versa, said factor being the time average of the product of rate of flow of cooling water in the reaction zone jacket times the temperature increase of said water in flowing through said jacket.

No references cited.

JOSEPH L. SCHOFER, *Primary Examiner.*

F. L. DENSON, *Assistant Examiner.*